C. ROUSE & N. C. NEEMES.
COAL LEVELING MACHINE.
APPLICATION FILED AUG. 6, 1908.
916,200.
Patented Mar. 23, 1909.
5 SHEETS—SHEET 1.
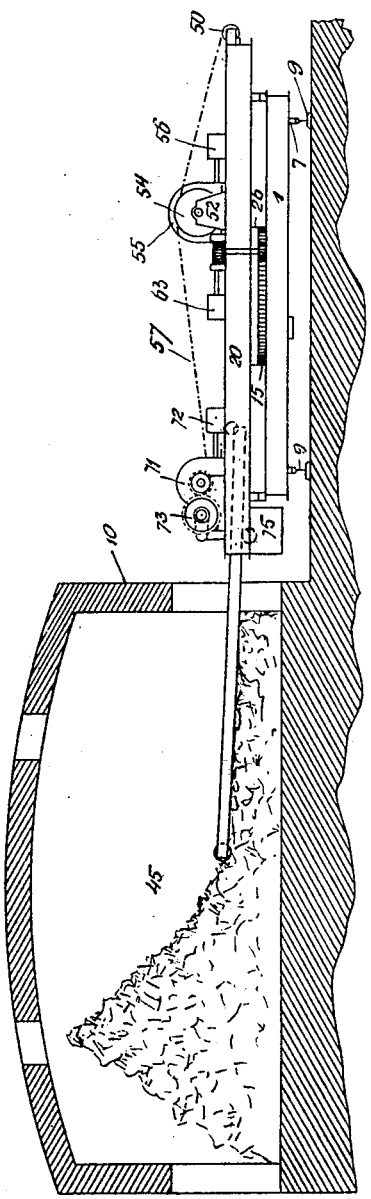

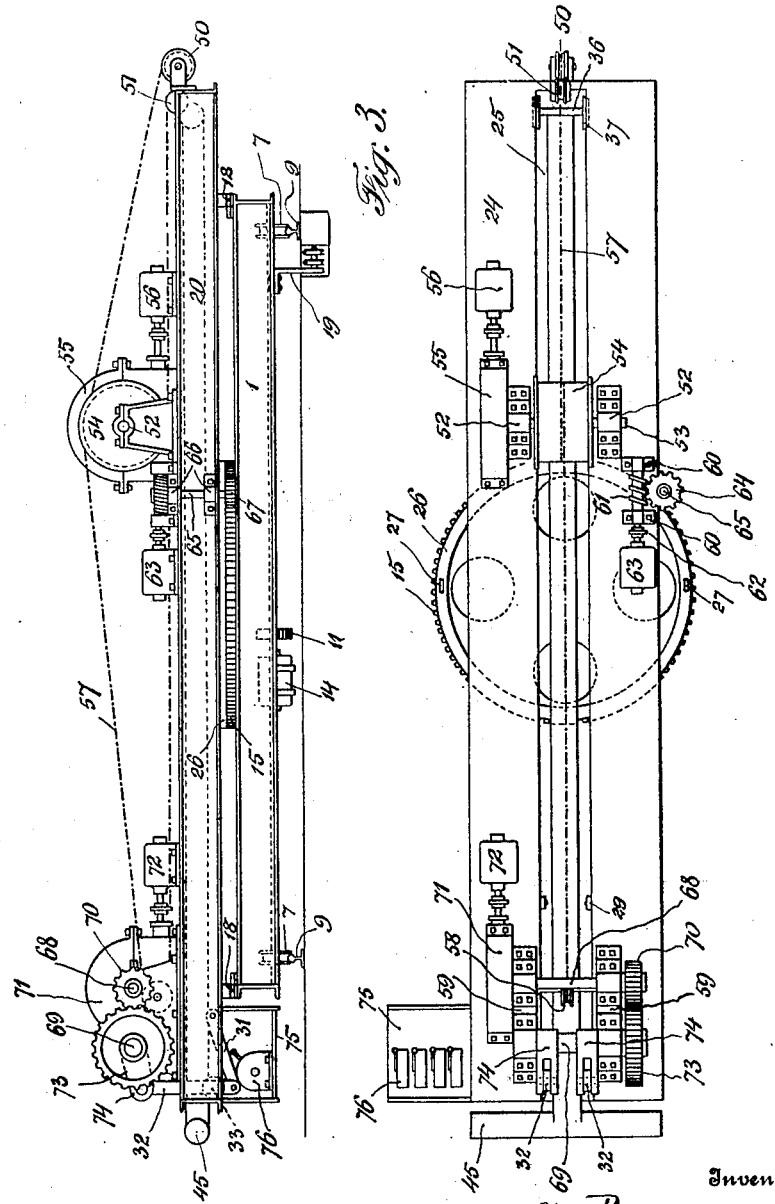

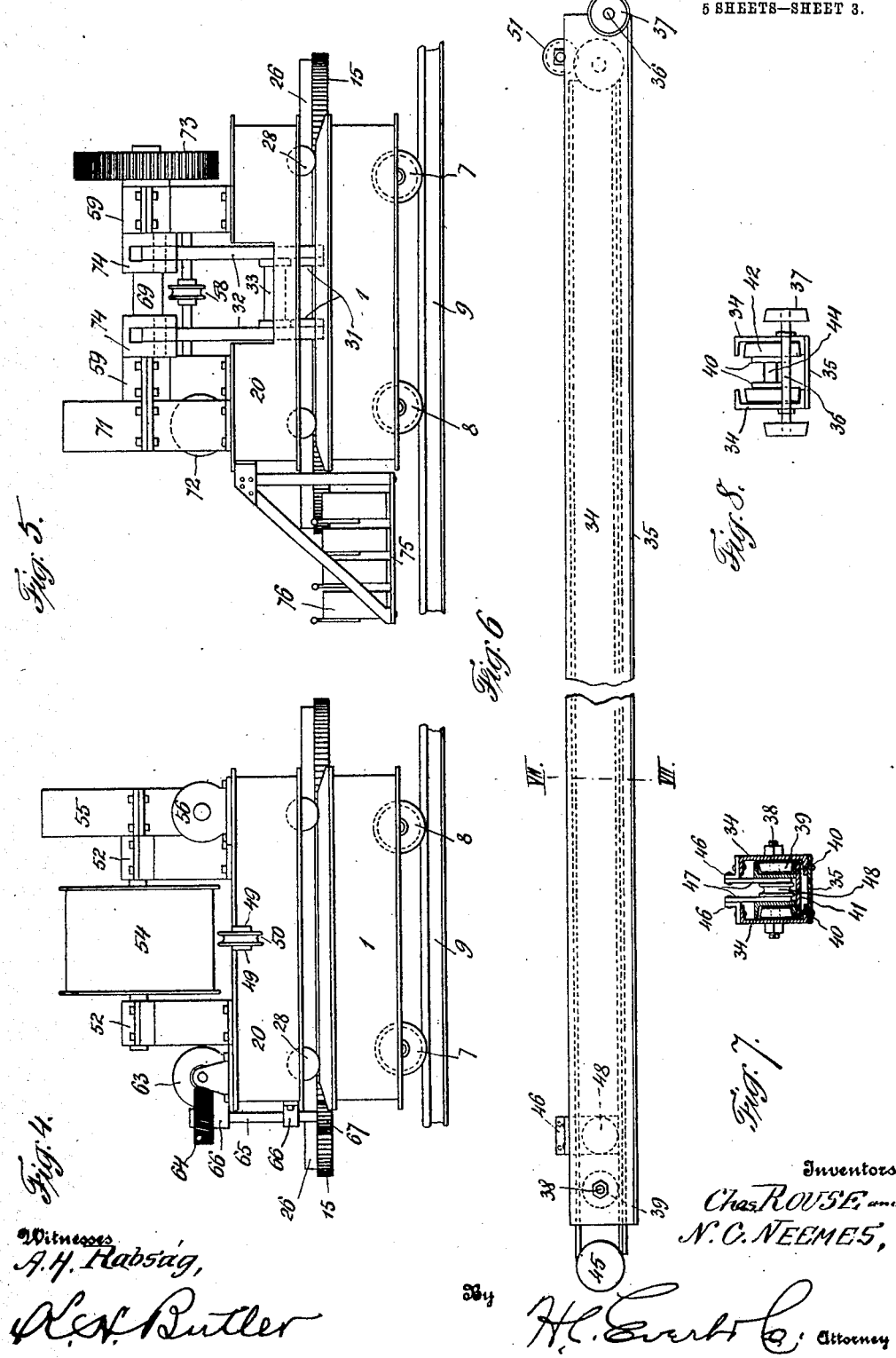

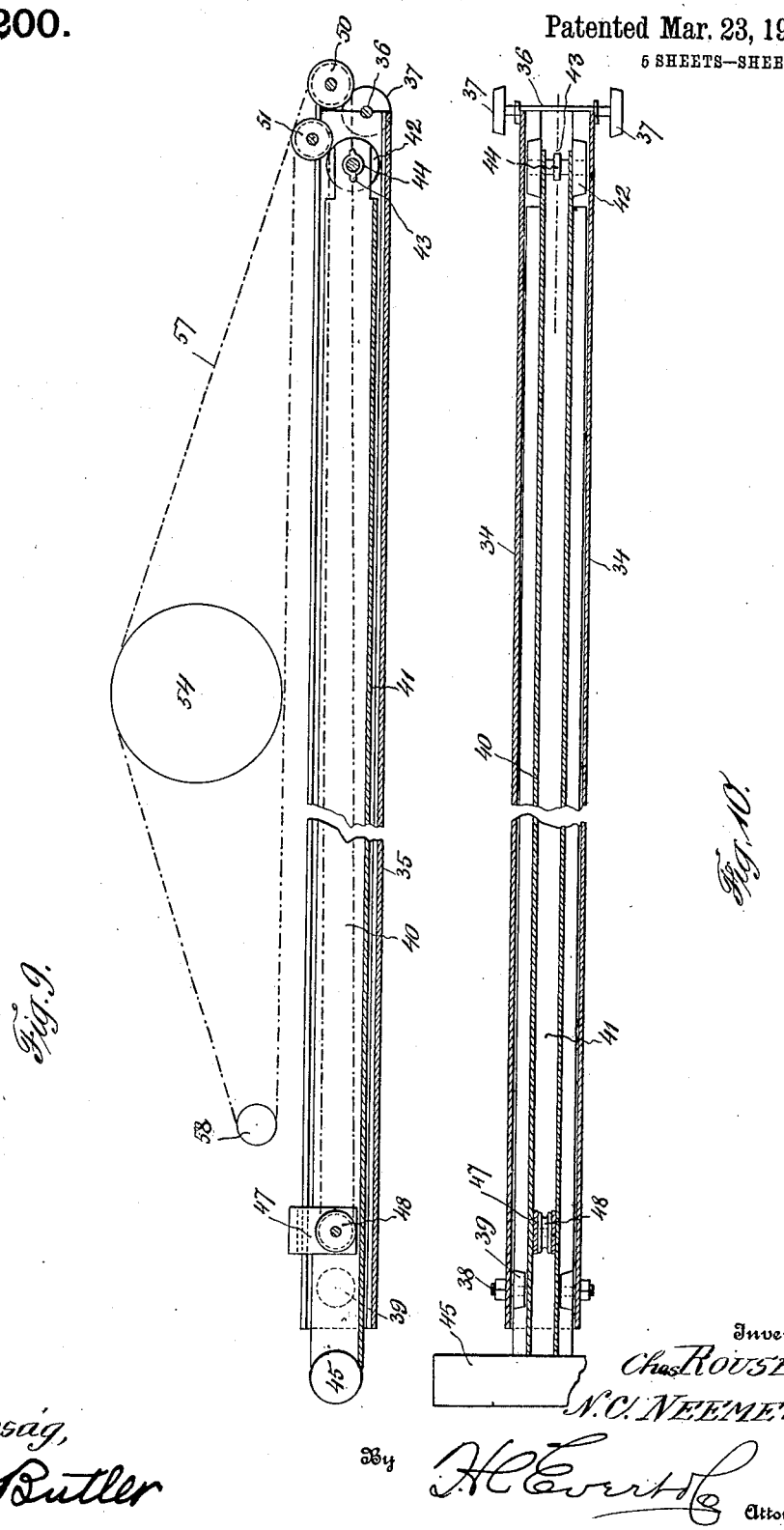

C. ROUSE & N. C. NEEMES.
COAL LEVELING MACHINE.
APPLICATION FILED AUG. 6, 1908.
916,200.
Patented Mar. 23, 1909.
5 SHEETS—SHEET 5.
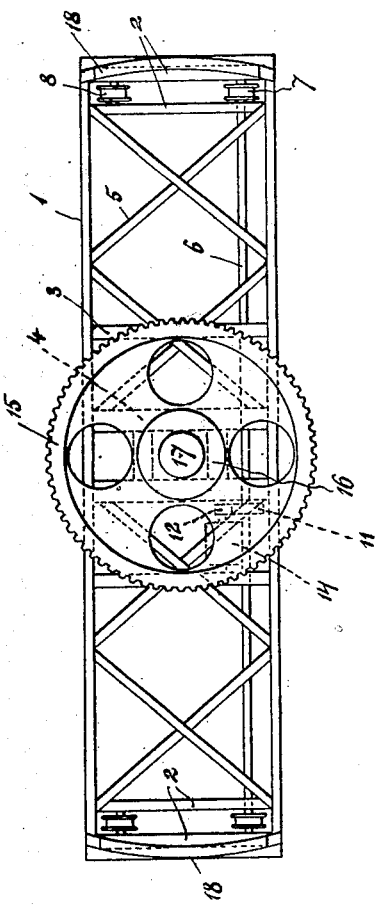
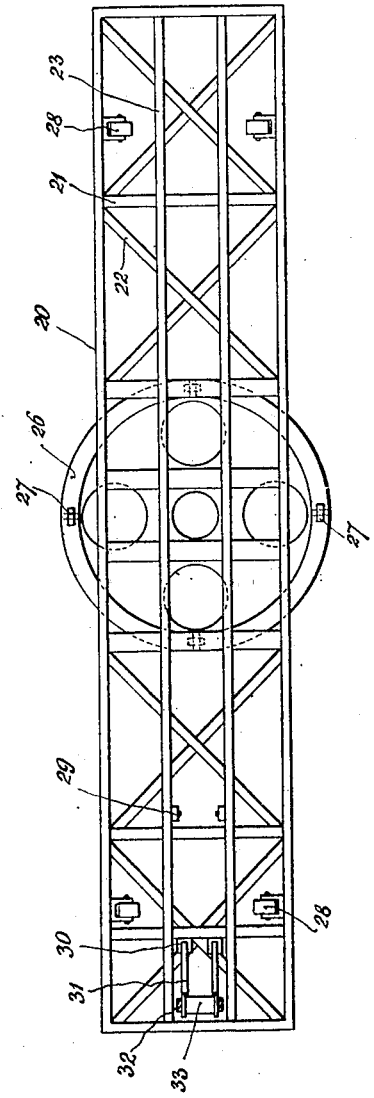
Witnesses
A. H. Rabsug,
O. N. Butler
Inventors
Chas. Rouse and
N. C. Neemes,
By H. C. Evert
Attorneys
THE NORRIS PETERS CO., WASHINGTON, D. C.

UNITED STATES PATENT OFFICE.

CHARLES ROUSE AND NORWELL C. NEEMES, OF PITTSBURG, PENNSYLVANIA.

COAL-LEVELING MACHINE.

No. 916,200.   Specification of Letters Patent.   Patented March 23, 1909.

Application filed August 6, 1908. Serial No. 447,288.

*To all whom it may concern:*

Be it known that we, CHARLES ROUSE and NORWELL C. NEEMES, citizens of the United States of America, residing at Pittsburg, in the county of Allegheny and State of Pennsylvania, have invented certain new and useful Improvements in Coal-Leveling Machines, of which the following is a specification, reference being had therein to the accompanying drawing.

This invention relates to coal leveling machines, and the object of our invention is to provide a novel machine for leveling coal in coke ovens, and that class of retorts employed in the production of coke.

Our invention aims to provide a coal leveling machine particularly designed for the oblong type of ovens, the machine being constructed whereby it can be used in connection with a group of ovens arranged in two confronting rows with the machine between the rows of ovens in order that said machine can be moved from one oven to another in one row, and then swung to operate upon the other row of ovens. To this end, we have devised a compact machine wherein a novel telescopic leveler is used for leveling and spreading coal in an oven, thus saving labor and expense and reducing the time heretofore required for manually leveling coal.

Our machine embodies a plurality of structural elements which are constructed of strong and durable metal, representing castings, angle bars, braces and frames that are assembled to provide a rigid non-frictional equally balanced machine.

An important feature of the machine resides in the telescopic leveler thereof, which is adapted to enter an oven and level coal previously dumped therein, the leveler being constructed and operated whereby the coal will not be broken or unduly disintegrated.

Our invention will be hereinafter described in detail, and reference will now be had to the drawings, wherein, Figure 1 is a longitudinal sectional view of an oven illustrating our machine diagrammatically with the telescopic leveler thereof extending into the oven, Fig. 2 is a side elevation of our machine, Fig. 3 a plan of the same, Fig. 4 is an end view of the rear of the machine, Fig. 5 is an end view of the front of the machine with the telescopic leveler thereof removed, Fig. 6 is a side elevation of the telescopic leveler partly broken away, Fig. 7 is a cross sectional view of the same taken on the line VII—VII of Fig. 6, Fig. 8 is an end view of the telescopic leveler, Fig. 9 is a longitudinal sectional view of the same, partly broken away, Fig. 10 is a horizontal sectional view, partly broken away, Fig. 11 is a plan of the carriage forming a part of the machine, and Fig. 12 is a plan of the revoluble frame of the machine.

To put our invention into practice, we provide a carriage adapted to travel back and forth before a coke oven. This carriage consists of an oblong metallic frame 1 provided with transverse girders 2, 3 and 4, connected by diagonally disposed braces 5. Journaled longitudinally of the frame 1 and extending through the girders 2, 3 and 4 is a shaft 6. This shaft between the girders 2 is provided with flanged wheels 7, and other flanged wheels 8 are journaled between the girders 2 whereby the carriage can travel upon rails 9 provided therefor, said rails constituting a track located in front of an oven 10.

The shaft 6 is provided with a gear wheel 11 meshing with a gear wheel 12 mounted upon the armature shaft of a motor 14, said motor being suspended within the frame between the girders 3 and 4.

Riveted or otherwise secured to the girders 3 is a circular rack 15 having a central bearing 16 and a pin 17.

The ends of the frame 1 are provided with curved tread plates or rails 18, the object of which will presently appear.

In order that the carriage can be moved upon the rails 9, we arrange a suitable trolley 19 (see Fig. 1) at one side of the track, this trolley supplying the electrical energy to the motor 14 and other motors to be hereinafter described.

Revolubly mounted upon the carriage is a frame consisting of side rails 20, transverse girders 21, diagonally disposed braces 22 and longitudinal beams 23, said side rails and beams supporting a platform 24 having a longitudinally disposed slot 25, corresponding in width to the distance between the beams 23.

The bottom of the frame is provided with a circular bearing plate 26 to receive the bearing pin 17 of the circular rack 15. The bearing plate 26 is provided with suitable anti-friction rollers 27, while the ends of the revoluble frame are provided with rollers 28 adapted to travel upon the tread plates or rails 18. The confronting sides of the beams 23 are provided with stop bars 29, the function of which will presently appear.

One of the transverse girders 21 at the forward end of the revoluble frame is provided with brackets 30 for pivoted arms 31, these arms connecting with vertical links 32 supporting a revoluble roller 33, the object of which will presently appear.

Movably mounted upon the revoluble frame 20 between the beams 23 is a telescopic leveler, said leveler consisting of an outer member and an inner member, these members being approximately the length of the machine and are substantially rectangular in cross section. The outer member comprises two channel-shaped beams 34 having their lower flanges connected together by a plate 35 extending the entire length of the channel-shaped beams. Mounted at the rear ends of the beams 34 is an axle 36 and journaled upon this axle are beveled wheels 37 adapted to travel upon the confronting flanges of the beams 23 of the frame 20, and support the rear end of the telescopic leveler. The rear ends of the beams 34 support a bracket. The forward ends of the beams 34 are provided with confronting stud bolts 38, and upon the confronting ends of these bolts are journaled beveled wheels 39, said wheels engaging the flanges of channel beams 40, forming the inner member of the telescopic leveler. The channel beams 40 have their lower flanges connected by a plate 41 extending the entire length of the inner member. The flanges of the beams 40 are cut away at the rear end of the inner member whereby beveled wheels 42, revolubly carried by said beams, can travel upon the flanges of the beams 34. The wheels 42 are preferably journaled upon an axle 43 mounted in the beams 40, this axle also supporting a ring 44, the object of which will presently appear. The forward ends of the beams 40 of the inner member support a transverse cylindrical head 45, this head corresponding in length to approximately the width of the machine. The outer member at the forward end thereof is provided with two angle plates 46, these plates supporting hangers 47 between the beams 40 of the inner member. Between the hangers 47 is journaled a sheave 48.

At the rear end of the frame 20 are arranged bearings 49 for a sheave 50, the beams 34 of the outer member supporting a revoluble sheave 51 adjacent to the sheave 50, and the object of the sheaves 48, 50 and 51 will presently appear.

Upon the platform 24 is arranged bearings 52 for a transverse revoluble shaft 53 supporting a drum 54. The shaft 53 extends into a casing 55 containing a train of gears (not shown) adapted to be operated by a motor 56 located adjacent to the casing 55. The train of gears within the casing 55 is of a conventional form, comprising gear wheels and a worm, said worm being coupled to the armature shaft of the motor 56.

In connection with the drum 54, sheaves 48, 50 and 51, and the ring 44, is used a cable 57. Both ends of the cable are attached to the ring 44 of the inner member. The cable extends forwardly under and over the sheave 48 supported by the outer member, rearwardly under and over the sheave 51 of the outer member, forwardly under and over a sheave 58, which is revolubly supported between bearings 59 arranged upon the plate 24 at the forward end of the machine. After passing over this sheave, the cable extends over and around the drum 54, downwardly over and under the sheave 50, and connects with the ring 44 as heretofore stated.

The plate 24 is provided with bearings 60 for a worm 61, which is coupled as at 62 to the armature shaft of a motor 63. The worm 61 meshes with a gear wheel 64, mounted upon the upper end of a shaft 65, journaled in bearings 66, carried by the side of the revoluble frame 20. The shaft extends downwardly to the circular rack 15 and is provided with a pinion 67 meshing with said rack.

The bearings 59 besides revolubly supporting the sheave 58, supports revoluble shafts 68 and 69. The former is provided with a pinion 70 and extends into a gear case 71 in which is located a train of gears adapted to be driven by a motor 72. The shaft 69 is provided with a gear wheel 73 meshing with the pinion 70 and with two bifurcated crank arms 74, said arms being pivotally connected to the links 32.

The forward end of the revoluble frame 20 is provided at one side with a suspended platform 75, and upon this platform is located four controllers 76, for controlling the motors 14, 56, 63 and 72.

Operation: The operator standing upon the suspended platform 75 can move the machine in any desired direction upon the rails 9, through the medium of one of the controllers 76, motor 14 and shaft 6. Assuming that the machine has been located in front of the oven 10 and the door thereof opened, the operator manipulates another controller to place the motor 56 in operation. The drum 54 will be rotated and as the cable 57 is held taut thereon, both members of the telescopic leveler will be extended, until the beveled wheels 37 of the outer member impinge the stop bars 29. A further movement of the drum extends the inner member of the leveler. Both members are first used to level the first pile of coal within the oven and then by extending the inner member, the second pile of coal is reached, leveled and spread. In order that the head 45 can reach the top of the pile of coal, the operator manipulates another controller to place the motor 72 in operation. The shafts 68 and 69 are then partially revolved, whereby the links 32 can be raised or lowered, and as the telescopic leveler rests upon the revoluble roller 33, said leveler can be elevated, and lowered by reversing the controller. To swing the revoluble frame around whereby an oven upon the opposite side can be operated upon, the operator manipulates the other of said controllers, which through the medium of motor 63, worm 61, gear wheel 64, shaft 65, pinion 67, and rack 15 will swing the frame around into the desired direction.

While in the drawings forming a part of this specification there is illustrated the preferred embodiments of our invention, it is obvious that the same can be varied or changed as to shape, proportion and manner of assemblage without departing from the spirit of the invention.

Having now described our invention what we claim as new, is:—

1. A coal leveling machine embodying a movable carriage, a circular rack carried thereby, a frame revolubly mounted upon said carriage, longitudinal beams mounted upon said frame, a telescopic leveler located upon said frame between said beams, said leveler comprising an outer member adapted to travel upon said beams, an inner member movably mounted in said outer member, a leveler head carried by the forward end of said inner member, means for moving said inner member in advance of said outer member, said means including sheaves, a drum located upon said frame, a cable encircling said drum and passing over said sheaves and connecting with the rear end of said inner member, a motor for operating said drum, means carried by said frame and engaging said rack for revolving said frame, means located at the forward end of said frame for raising said telescopic leveler, said means including pivoted arms, links, a revoluble roller, a crank shaft for moving said links and a motor for operating said crank shaft, and means supported by said frame for controlling the operation of said motors and the movement of said carriage.

2. A coal leveling machine embodying a movable carriage, a circular rack carried thereby, a frame revolubly mounted upon said carriage, beams supported by said carriage, a telescopic leveler located upon said frame between said beams, said leveler comprising an outer member adapted to travel upon said beams, an inner member movable within said outer member, a leveler head carried by the forward end of said inner member, means for moving said inner member in advance of said outer member, said means including sheaves, a drum supported by said frame, a cable wound upon said drum and passing over said sheaves and having the ends thereof connected to the rear end of said inner member, a motor for operating said drum, means located at the forward end of said frame for elevating said telescopic leveler, said means including a revoluble roller, a crank shaft for elevating said roller, a motor for operating said crank shaft, and means carried by said frame and engaging said rack for revolving said frame.

3. A coal leveling machine embodying a movable carriage, a circular rack carried thereby, a frame revolubly mounted upon said carriage, beams supported by said carriage, a telescopic leveler located upon said frame between said beams, said leveler comprising an outer member adapted to travel upon said beams, an inner member movable within said outer member, a leveler head carried by the forward end of said inner member, means for moving said inner member in advance of said outer member, said means including sheaves, a drum supported by said frame, a cable wound upon said drum and passing over said sheaves and having the ends thereof connected to the rear end of said inner member, a motor for operating said drum, means located at the forward end of said frame for elevating said telescopic leveler, said means including a revoluble roller, a crank shaft for elevating said roller, and a motor for operating said crank shaft.

4. A coal leveling machine embodying a movable carriage, a circular rack carried thereby, a frame revolubly mounted upon said carriage, a telescopic leveler movably mounted upon said frame, said leveler comprising an outer member, an inner member movably mounted in said outer member and movable independently of the outer member and in unison therewith, a leveler head carried by the forward end of said inner member, and means for moving said members, said means acting to move the inner member to the extent of its independent movement before moving the members in unison.

5. A coal leveling machine embodying a carriage, a frame revolubly mounted on said carriage, a telescopic leveler located on said frame, said leveler comprising an outer member, and an inner member movably mounted in said outer member longitudinally thereof independently of the outer member, a leveler head carried by the forward end of said inner member, means for independently moving said inner member to the full extent of its independent movement, and means whereby the members are caused to move in unison when the limit of independent movement of the inner member is reached.

6. A coal leveling machine embodying a carriage, a frame revolubly mounted upon said carriage, a telescopic leveler located on said frame, said leveler comprising an outer member and an inner member movably mounted in said outer member means for moving said members, said means moving the inner member independently and longitudinally of the outer member, stops on each member and means on the other member to engage said stops to limit the independent movement of the inner member, said members moving in unison when the limit of independent movement of the inner member is reached, and means for operating said revoluble frame.

7. A coal leveling machine embodying a carriage, a revoluble frame mounted thereon, a telescopic leveler located upon said frame, said leveler comprising two members movably connected together, a leveler head carried by the inner member, means for moving said members, said means including a drum, sheaves, and a cable having the ends thereof connected to one of said members and passing over said sheaves and said drum.

8. A coal leveling machine embodying a carriage, a revoluble frame, a telescopic leveler located upon said frame, said leveler comprising two members movably connected together, a cable connecting with one of said members for moving said members, and sheaves arranged whereby one of said members will be moved in advance of the other of said members.

9. In a leveler of the type described, two movably supported members extensible one with relation to the other and movable one independently of the other and in unison therewith, stops arranged to limit the movement of one member with relation to the other member, and a common means for moving both members, said means acting to move the independently moving members to the full extent of its extensible movement before moving the members in unison.

In testimony whereof we affix our signatures in the presence of two witnesses.

CHARLES ROUSE.
NORWELL C. NEEMES.

Witnesses:
MAX H. SROLOVITZ,
K. H. BUTLER.